United States Patent
Chen et al.

(10) Patent No.: US 10,525,412 B2
(45) Date of Patent: Jan. 7, 2020

(54) OXIDATION CATALYST FOR TREATING A NATURAL GAS EMISSION

(71) Applicant: Johnson Matthey Public Limited Company, London (GB)

(72) Inventors: Hai-Ying Chen, Conshohocken, PA (US); Joseph Michael Fedeyko, Malvern, PA (US); Jing Lu, Glen Mills, PA (US); Paul Joseph Andersen, Plymouth Meeting, PA (US); Arthur Joseph Reining, Christiana, PA (US); Rita Aiello, King of Prussia, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/996,288

(22) Filed: Jan. 15, 2016

(65) Prior Publication Data

US 2016/0236147 A1    Aug. 18, 2016

Related U.S. Application Data

(60) Provisional application No. 62/115,987, filed on Feb. 13, 2015.

(30) Foreign Application Priority Data

Mar. 24, 2015    (GB) .................................. 1504986.9

(51) Int. Cl.
    *F01N 3/10*     (2006.01)
    *B01D 53/94*    (2006.01)
    (Continued)

(52) U.S. Cl.
    CPC ............ *B01D 53/944* (2013.01); *B01J 29/44* (2013.01); *B01J 29/7415* (2013.01);
    (Continued)

(58) Field of Classification Search
    CPC ........ F01N 3/085; F01N 3/103; F01N 3/2828; F01N 3/0222; B01D 2201/02; B01D 2255/102; B01J 29/047
    (Continued)

(56) References Cited

U.S. PATENT DOCUMENTS

| 5,358,631 A | 10/1994 | Miller et al. |
| 6,599,570 B1 | 7/2003 | Aderhold et al. |

(Continued)

FOREIGN PATENT DOCUMENTS

| WO | 199501222 A1 | 1/1995 |
| WO | 2006057760 A1 | 6/2006 |

OTHER PUBLICATIONS

Gelin et al.; Complete oxidation of methane at low temperature over noble metal based catalysts: a review; Applied Catalysis B: Environmental 39 (2002) 1-37.
(Continued)

*Primary Examiner* — Tom P Duong

(57) ABSTRACT

A catalytic material for treating an exhaust gas produced by a natural gas engine, which catalytic material comprises a molecular sieve and a platinum group metal (PGM) supported on the molecular sieve, wherein the molecular sieve has a framework comprising silicon, oxygen and optionally germanium, and has a content of heteroatom T-atoms is ≤about 0.20 mol %.

26 Claims, 4 Drawing Sheets

(51) Int. Cl.

| | | |
|---|---|---|
| *B01J 29/74* | (2006.01) | |
| *B01J 35/04* | (2006.01) | |
| *F01N 3/08* | (2006.01) | |
| *F01N 3/28* | (2006.01) | |
| *F01N 3/022* | (2006.01) | |
| *B01J 37/03* | (2006.01) | |
| *B01J 29/44* | (2006.01) | |
| *B01J 37/02* | (2006.01) | |
| *B01J 35/02* | (2006.01) | |
| *F01N 3/035* | (2006.01) | |
| *B01J 29/08* | (2006.01) | |

(52) U.S. Cl.
CPC ............. *B01J 35/023* (2013.01); *B01J 35/04* (2013.01); *B01J 37/0201* (2013.01); *B01J 37/038* (2013.01); *F01N 3/0222* (2013.01); *F01N 3/085* (2013.01); *F01N 3/103* (2013.01); *F01N 3/2828* (2013.01); *B01D 2255/102* (2013.01); *B01D 2255/1021* (2013.01); *B01D 2255/1023* (2013.01); *B01D 2255/207* (2013.01); *B01D 2255/2092* (2013.01); *B01D 2255/20707* (2013.01); *B01D 2255/20723* (2013.01); *B01D 2255/20738* (2013.01); *B01D 2255/20792* (2013.01); *B01D 2255/50* (2013.01); *B01D 2255/502* (2013.01); *B01D 2255/9022* (2013.01); *B01D 2255/9025* (2013.01); *B01D 2255/9032* (2013.01); *B01D 2255/9155* (2013.01); *B01D 2258/018* (2013.01); *B01J 2029/081* (2013.01); *F01N 3/035* (2013.01); *Y02T 10/20* (2013.01); *Y02T 10/36* (2013.01)

(58) Field of Classification Search
USPC .................................. 422/177, 180; 60/274
See application file for complete search history.

(56) References Cited

U.S. PATENT DOCUMENTS

| | | |
|---|---|---|
| 8,641,993 B2 | 2/2014 | Dotzel et al. |
| 8,703,236 B2 | 4/2014 | Chandler et al. |
| 8,772,192 B2 | 7/2014 | Khanmamedova et al. |
| 2005/0197515 A1 | 9/2005 | Juttu et al. |
| 2006/0010859 A1* | 1/2006 | Yan ........................ F01N 13/011 60/286 |
| 2008/0293990 A1 | 11/2008 | Stevenson et al. |
| 2009/0081099 A1 | 3/2009 | Yuen |
| 2012/0201731 A1* | 8/2012 | Ballinger ........... B01D 53/9418 423/213.2 |
| 2012/0252658 A1* | 10/2012 | Kunieda ............ B01D 46/2429 502/68 |
| 2012/0308439 A1 | 12/2012 | Chen et al. |
| 2014/0065042 A1 | 3/2014 | Anderson et al. |
| 2014/0140911 A1* | 5/2014 | Bergeal ................ B01D 53/945 423/213.5 |
| 2014/0193327 A1* | 7/2014 | Casci ...................... B01J 35/04 423/700 |
| 2014/0356530 A1 | 12/2014 | Roberts et al. |
| 2015/0336091 A1* | 11/2015 | Ojo ..................... B01J 29/7492 423/700 |
| 2016/0236147 A1 | 8/2016 | Chen et al. |

OTHER PUBLICATIONS

Guliaeff, A., Wanninger, K., Klose, R, Maletz, G. et al.; Development of a Sulfur Tolerant PGM Based Zeolite Catalyst for Technical Paper Methane Oxidation and Low Temperature Hydrocarbon Trapping; SAE International Paper #: 2013-01-0531; Published: Apr. 8, 2013.

Guliaeff et al.; Development of a Sulfur Tolerant PGM Based Zeolite Catalyst for Methane Oxidation and Low Temperature Hydrocarbon Trapping; SAE International; doi:10.4271/2013-01-0531; Published Apr. 8, 2013.

* cited by examiner

OXIDATION CATALYST FOR TREATING A NATURAL GAS EMISSION

FIELD OF THE INVENTION

The invention relates to a catalytic material and to an oxidation catalyst for treating an exhaust gas containing a substantial amount of methane/ethane, and to methods involving their use. The invention further relates to an exhaust system comprising the oxidation catalyst. The invention also concerns an apparatus or a vehicle comprising the oxidation catalyst.

BACKGROUND TO THE INVENTION

Legislation restricting the amount of pollutants that may be emitted into the atmosphere is becoming increasingly strict. One category of pollutant that is legislated against by inter-governmental organisations throughout the world is unburned hydrocarbons (HCs). Unburned HCs of varying composition are typically present in exhaust gases produced by various types of mobile or stationary engine, such as spark ignition engines, compression ignition engines and combustion turbines.

Natural gas (NG) typically comprises a hydrocarbon (HC) gas mixture and small amounts of carbon dioxide ($CO_2$), hydrogen sulfide ($H_2S$), water vapour ($H_2O$) and nitrogen ($N_2$). The main component of NG is methane ($CH_4$), but relatively small amounts of ethane ($C_2H_6$), propane ($C_3H_8$) and other hydrocarbons are usually also present. There is interest in using natural gas (NG) as a fuel for engines, particularly in the form of either compressed natural gas (CNG) or liquefied natural gas (LNG). For vehicular applications, the use of CNG as a fuel is typically preferred over LNG because CNG generally has both lower production and storage costs compared to LNG.

Engines have been produced that are purpose-built for using NG as a fuel. It is also possible to modify existing internal combustion engines to use NG. Engines are known that can use NG as a fuel in a variety of ways, such as alone (e.g. a "dedicated" NG engine) or in conjunction with another fuel (e.g. a bi-fuel engine) where the engine may be run on one fuel at a time or both fuels may be used in unison. When NG is used as a fuel, the exhaust gas produced by the engine contains significant quantities of methane (so-called "methane slip"). Methane is a potent greenhouse gas (GHG). Also, in comparison to other HCs that are typically present in an exhaust gas, methane and ethane are difficult to catalytically oxidise over a catalytic convertor, especially in the presence of excess oxygen, such as in the exhaust gas produced by lean burn NG combustion engines.

Commercially available oxidation catalysts for treating methane/ethane typically comprise palladium (Pd) or platinum (Pt) and palladium (Pd) supported on alumina ($Al_2O_3$). These catalysts have to be operated at high temperatures (e.g. >500° C.) to achieve reasonable methane conversion efficiency. Other oxidation catalysts have been investigated but they often suffer from poor thermal stability. There is also the problem that many methane oxidation catalysts are sensitive to poisoning by sulfur.

The oxidation of methane using noble metal based catalyst has been reviewed by P. Gélin and M. Primet (*Applied Catalysis B: Environmental*, 39 (2002), 1-37). Oxidation catalysts comprising Pd supported on a zeolite are described. The authors concluded that the "use of zeolitic supports did not bring any evidence of improved catalytic activity in methane oxidation of Pd catalysts".

SUMMARY OF THE INVENTION

The inventors have unexpectedly discovered a catalytic material that has advantageous oxidative activity toward methane/ethane, particularly when the methane/ethane is part of an exhaust gas containing an excess of oxygen. The catalytic material can achieve high methane/ethane conversion efficiency at relatively low temperatures compared to conventional oxidation catalysts. The catalytic material has good thermal stability and on-stream stability in the presence of the gas mixture and water vapour, and can show good tolerance toward sulfur. In particular, the catalytic material can be readily desulphated and its activity can be regenerated under lean conditions.

The invention provides a catalytic material comprising a molecular sieve and a platinum group metal (PGM) supported on the molecular sieve, wherein the molecular sieve has a framework comprising silicon, oxygen and optionally germanium, and has a content of heteroatom T-atoms of ≤about 0.20 mol %. The catalytic material is suitable for treating an exhaust gas produced by a natural gas (NG) engine.

The invention further provides an oxidation catalyst, which is suitable for treating methane/ethane or an exhaust gas produced by a natural gas (NG) engine. The oxidation catalyst comprises a catalytic material of the invention and a substrate.

The catalytic material of the invention shows surprisingly good oxidative activity toward methane and/or ethane (abbreviated herein as "methane/ethane"). It may also have a low methane light-off temperature and/or a low ethane light-off temperature. To achieve satisfactory methane/ethane conversion activity, heating the catalytic material to high temperatures may not be necessary.

Another advantage of the catalytic material of the invention is that it has good thermal stability, particularly under hydrothermal conditions (i.e. in the presence of water vapour). When the catalytic material is used at relatively high temperatures, the oxidative activity of the catalytic material toward methane/ethane does not significantly deteriorate.

A further advantage provided by the catalytic material of the invention is that at relatively low temperatures (e.g. <500° C.), the on-stream activity in the presence of water vapour and does not decline as observed in alumina-supported catalysts.

Also provided by the invention is an exhaust system, which is suitable for treating an exhaust gas containing methane. The exhaust system comprises an oxidation catalyst of the invention.

The invention also relates to an apparatus. The apparatus comprises an engine and an exhaust system of the invention. The apparatus may be a vehicle.

A further aspect of the invention relates to a method of treating an exhaust gas containing methane, which method comprises: contacting the exhaust gas with either a catalytic material of the invention or an oxidation catalyst of the invention.

The invention provides various methods for the manufacture of an oxidation catalyst comprising a catalytic material in accordance with the invention.

In a first method aspect, the method for the manufacture of an oxidation catalyst comprises the steps of:

(i) preparing a washcoat comprising a catalytic material, wherein the catalytic material comprises a molecular sieve and a platinum group metal (PGM) supported on the molecular sieve, wherein the molecular sieve has a framework comprising silicon, oxygen and optionally germanium, and has a content of heteroatom T-atoms of ≤about 0.20 mol %; and (ii) applying the washcoat to the substrate.

In a second method aspect, the method for the manufacture of an oxidation catalyst comprises:

(a) forming an extruded solid body comprising the catalytic material by:
  (i) preparing a mixture comprising a powdered catalytic material and optionally at least one component selected from the group consisting of a binder/matrix component, an inorganic fibre and a combination thereof, wherein the catalytic material comprises a molecular sieve and a platinum group metal (PGM) supported on the molecular sieve, wherein the molecular sieve has a framework comprising silicon, oxygen and optionally germanium, and has a content of heteroatom T-atoms of ≤about 0.20 mol %;
  (ii) extruding the mixture into an extruded solid body (e.g. substrate) and optionally drying and/or calcining the extruded solid body.

In a third method aspect, the method for the manufacture of an oxidation catalyst comprises:

(a) forming an extruded solid body comprising the molecular sieve by:
  (i) preparing a mixture comprising a powdered molecular sieve and optionally at least one component selected from the group consisting of a binder/matrix component, an inorganic fibre and a combination thereof, wherein the molecular sieve has a framework comprising silicon, oxygen and optionally germanium, and has a content of heteroatom T-atoms of ≤about 0.20 mol %;
  (ii) extruding the mixture into an extruded solid body (e.g. substrate) and optionally drying and/or calcining the extruded solid body; and
(b) forming the catalytic material by impregnating the molecular sieve in the extruded solid body with a platinum group metal (PGM) to support the platinum group metal (PGM) on the molecular sieve.

In a fourth method aspect, the method for the manufacture of an oxidation catalyst comprises the steps of:

(i) preparing a washcoat comprising a molecular sieve, wherein the molecular sieve has a framework comprising silicon, oxygen and optionally germanium, and has a content of heteroatom T-atoms of ≤about 0.20 mol %; and (ii) applying the washcoat to the substrate to form a coated substrate, and then optionally drying and/or optionally calcining the coated substrate; and (iii) impregnating the molecular sieve with a platinum group metal (PGM) (e.g. by applying a solution comprising the platinum group metal onto the coated substrate) to produce a catalytic material comprising the molecular sieve and the platinum group metal (PGM) supported on the molecular sieve.

DETAILED DESCRIPTION OF THE INVENTION

Figure 1:
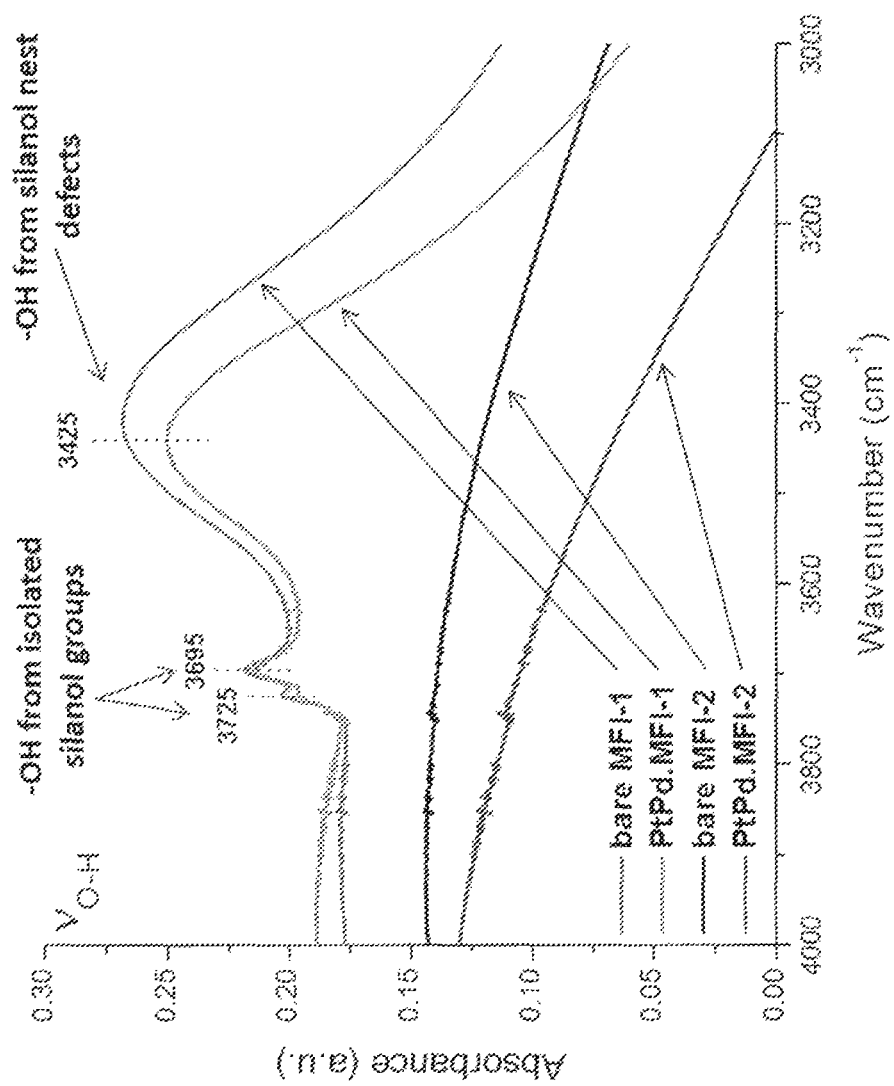
FIG. 1 shows transmission FTIR spectra in the —OH stretching region of bare MFI-1 and MFI-2 zeolites and the corresponding zeolites supporting Pt and Pd.

The invention provides a catalytic material comprising, or consisting essentially of, a molecular sieve and a platinum group metal (PGM). The platinum group metal (PGM) is supported on the molecular sieve.

The molecular sieve is typically a crystalline molecular sieve, such as a zeolite.

Typically, the molecular sieve has a framework having a content of heteroatom T-atoms of ≤about 0.20 mol %. As is known in the art, the term "T-atom" is an abbreviation for "tetrahedrally coordinated atom", which is present in the framework of the molecular sieve.

The term "heteroatom" as used herein in the context of "T-atoms" refers to atoms that are not silicon and not oxygen (i.e. non-silicon, non-oxygen heteroatoms), particularly atoms that are not silicon, not germanium and not oxygen (i.e. non-silicon, non-germanium, non-oxygen heteroatoms). The molecular sieve may have a framework that comprises one or more heteroatom T-atom. The heteroatom may, for example, be selected from the group consisting of aluminium (Al), boron (B), gallium (Ga), titanium (Ti), zinc (Zn), iron (Fe), vanadium (V) and combinations of any two or more thereof. More preferably, the heteroatom is selected from the group consisting of aluminium (Al), boron (B), gallium (Ga), titanium (Ti), zinc (Zn), iron (Fe) and combinations of any two or more thereof. For the avoidance of doubt, the heteroatom T-atoms cannot be germanium. The molecular sieve may have a framework comprising silicon, oxygen, germanium and heteroatom T-atoms, and a content of heteroatom T-atoms is ≤about 0.20 mol % (or as defined below). It may be preferable that the molecular sieve has a framework consisting essentially of silicon, oxygen, germanium and heteroatom T-atoms. More preferably, the molecular sieve may have a framework consisting essentially of silicon, oxygen and germanium (e.g. as the constituent atoms of the framework), wherein the amount of germanium is as defined below (e.g. the content of heteroatom T-atoms is 0.00 mol %).

When the molecular sieve has a framework comprising germanium, then typically the amount of germanium (e.g. germanium T-atoms) is ≤about 10 mol %, preferably ≤about 5 mol % and more preferably ≤about 1 mol %.

The invention provides a catalytic material comprising a molecular sieve and a platinum group metal (PGM) supported on the molecular sieve, wherein the molecular sieve has a framework comprising silicon, oxygen and optionally germanium, and a content of heteroatom T-atoms is ≤about 0.20 mol %.

The molecular sieve may have a framework comprising silicon, oxygen and heteroatom T-atoms, and a content of heteroatom T-atoms is ≤about 0.20 mol % (or as defined below). It may be preferable that the molecular sieve has a framework consisting essentially of silicon, oxygen and heteroatom T-atoms (e.g. as the constituent atoms of the framework). More preferably, the molecular sieve may have a framework consisting essentially of silicon and oxygen (e.g. the content of heteroatom T-atoms is 0.00 mol %).

The molecular sieve may preferably have a content of heteroatom T-atoms of <about 0.17 mol %, more preferably ≤about 0.15 mol %, such as <about 0.15 mol %, and even more preferably ≤about 0.12 mol % (e.g. <about 0.12 mol %).

Typically, the molecular sieve may have a content of heteroatom T-atoms of ≥about 0.001 mol %, preferably ≥about 0.010 mol %, more preferably ≥about 0.020 mol %.

In some instances, the molecular sieve does not have a content of heteroatom T-atoms (i.e. the molecular sieve does not comprise heteroatom T-atoms).

The molecular sieve may be microporous or mesoporous. In accordance with the IUPAC definitions of "microporous" and "mesoporous" (see *Pure & Appl. Chem.*, 66(8), (1994), 1739-1758), a microporous molecular sieve has pores with a diameter of less than 2 nm and a mesoporous molecular sieve has pores with a diameter of 2 nm to 50 nm.

The molecular sieve may be mesoporous. When the molecular sieve is a mesoporous molecular sieve, then typically the mesoporous molecular sieve may be selected from the group consisting of MCM-41, MCM-48, MCM-50, FSM-16, AMS, SBA-1, SBA-2, SBA-3, SBA-15, HMS, MSU, SBA-15 and KIT-1.

Typically, the molecular sieve, particularly when the molecular sieve is microporous, has a framework type selected from the group consisting of AEI, AFI, AFX, ANA, AST, ASV, ATS, BCT, BEA, BEC, BOF, BOG, BRE, CAN, CDO, CFI, CGS, CHA, -CHI, CON, DAC, DDR, DOH, DON, EAB, EDI, EEI, EMT, EON, EPI, ERI, ESV, ETR, EUO, FAR, FAU, FER, GON, HEU, IFR, IFW, IFY, IHW, IMF, IRN, IRR, -IRY, ISV, ITE, ITG, ITH, -ITN, ITR, ITT, -ITV, ITW, IWR, IWS, IWV, IWW, JOZ, KFI, LEV, LOV, LTA, LTF, MAZ, MEI, MEL, MEP, MER, MFI, MFS, MOR, MOZ, MRE, MSE, MSO, MTF, MTN, MTT, MTW, MVY, MWW, NAB, NES, NON, NSI, OBW, OFF, OKO, PAU, PCR, PHI, POS, RHO, -RON, RRO, RSN, RTE, RTH, RUT, RWR, RWY, SEW, SFE, SFF, SFG, SFH, SFN, SFS, SFV, SFW, SGT, SOD, SOF, SSF, -SSO, SSY, STF, STI, STO, STT, STW, -SVR, SVV, SZR, TON, TUN, UFI, UOS, UOV, UTL, UWY, VET, VNI and VSV. Each of the aforementioned three-letter codes represents a framework type in accordance with the "IUPAC Commission on Zeolite Nomenclature" and/or the "Structure Commission of the International Zeolite Association".

It is preferred that the molecular sieve is a zeolite. The zeolite may be referred to as a silica-containing zeolite, such as a siliceous zeolite.

The zeolite is typically selected from the group consisting of an aluminosilicate zeolite, a boro-aluminosilicate zeolite, a gallium aluminosilicate zeolite, a germanosilicate zeolite and a titaniosilicate zeolite. In each of these types of zeolite, the content of heteroatom T-atoms is as defined above. Thus, these zeolites are siliceous (i.e. high silica-containing) zeolites having a low content of heteroatom T-atoms, such as aluminium (Al), boron (B), gallium (Ga), and titanium (Ti) and optionally also zinc (Zn), iron (Fe).

It is preferred that the zeolite is a siliceous zeolite, such as a pure silica zeolite. The siliceous zeolite or pure silica zeolite may be a zeolite selected from the tables below.

As is known in the art, a siliceous zeolite or pure silica zeolite has a framework comprising, or consisting essentially of, $SiO_4$ tetrahedra.

| Siliceous zeolite or pure silica zeolite | Framework type |
|---|---|
| SSZ-24 | AFI |
| octadecasil | AST |
| SSZ-55 | ATS |
| zeolite beta | BEA |
| ITQ-14 | BEC |
| CIT-5 | CFI |
| chabazite | CHA |
| deca-dodecasil | DDR |
| dodecasil-1H | DOH |
| UTD-1 | DON |
| EU-1 | EUO |
| dealuminated zeolite-Y | FAU |
| ferrierite | FER |
| GUS-1 | GON |
| SSZ-42 | IFR |
| ITQ-4 | IFR |
| ITQ-32 | IHW |
| ITQ-7 | ISV |
| ITQ-3 | ITE |
| ITQ-13 | ITH |
| ITQ-12 | ITW |
| ITQ-24 | IWR |
| ITQ-29 | LTA |

-continued

| Siliceous zeolite or pure silica zeolite | Framework type |
| --- | --- |
| ZSM-11 | MEL |
| silicalite | MFI |
| SSZ-61 | — |
| ZSM-5 | MFI |
| MCM-35 | MTF |
| ZSM-39 | MTN |
| dodecasil-3c | MTN |
| CF-4 | MTN |
| ZSM-23 | MTT |
| ZSM-12 | MTW |
| ITQ-1 | MWW |
| MCM-22 | MWW |
| SSZ-35 | MWW |
| nonasil | NON |
| RUB-41 | RRO |
| RUB-3 | RTE |
| RUB-10 | RUT |
| RUB-24 | RWR |
| SSZ-73 | SAS |
| sigma-2 | SGT |
| sodalite trioxane | SOD |
| sodalite ethylene glycol | SOD |
| SSZ-35 | STF |
| ITQ-9 | STF |
| MU-26 | STF |
| SSZ-23 | STT |
| theta-1 | TON |
| SSZ-26 | — |
| SSZ-31 | — |

It is generally preferred that the molecular sieve, particularly when the molecular sieve is a zeolite, has a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, -ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, -SSO, SSY, STF, STO, STT, -SVR, SW, TON, TUN, UOS, UOV, UTL, UWY, VET, VNI. More preferably, the molecular sieve or zeolite has a framework type selected from the group consisting of BEA, CDO, CON, MEL, MWW, MFI and FAU, even more preferably the framework type is selected from the group consisting of BEA and MFI.

When a heteroatom T-atom is aluminium, the molecular sieve or zeolite may have a SAR of ≥1200. It may be preferable that the SAR is ≥1300, such as ≥1500 (e.g. ≥1700), more preferably ≥2000, such as ≥2200.

The zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms).

Various methods are known in the art for preparing molecular sieves, particularly zeolites, with a high silica content (e.g. a high SAR), and a specific framework type and pore diameter. Numerous methods are also known for preparing a transition metal, such as a platinum group metal, supported on a zeolite. See, for example, WO 2012/166868.

In a first catalytic material embodiment, the molecular sieve or zeolite is a small pore molecular sieve or zeolite. The small pore molecular sieve or zeolite preferably has a Framework Type selected from the group consisting of AEI, AFX, ANA, CDO, CHA, DDR, EAB, EDI, EPI, ERI, IHW, ITE, ITW, KFI, LEV, MER, NSI, PAU, PHI, RHO, RTH, UFI and VNI. More preferably, the small pore molecular sieve or zeolite has a Framework Type that is CHA, CDO or DDR.

In a second catalytic material embodiment, the molecular sieve or zeolite is a medium pore molecular sieve or zeolite. The medium pore molecular sieve or zeolite preferably has a Framework Type selected from the group consisting of MFI, MEL, MWW and EUO. More preferably, the medium pore molecular sieve or zeolite has a Framework Type selected from the group consisting of MFI, MEL and MWW, such as MFI.

In a third catalytic material embodiment, the molecular sieve or zeolite is a large pore molecular sieve or zeolite. The large pore molecular sieve or zeolite preferably has a Framework Type selected from the group consisting of AFI, CON, BEA, FAU, MOR and EMT. More preferably, the large pore molecular sieve or zeolite has a Framework Type selected from the group consisting of AFI, BEA, CON and FAU, such as BEA.

In general, the catalytic material of the invention may comprise a siliceous zeolite or a pure silica zeolite. It was surprisingly found that a catalytic material comprising such a zeolite can provide the advantages mentioned above. The catalytic material of the invention is particularly advantageous when the zeolite has an abundance of silanol groups.

It may be preferable that the molecular sieve, particularly when the molecular sieve is a zeolite, such as a siliceous zeolite or pure silica zeolite, comprises at least 0.010 mmol/g of silanol groups. More preferably, the molecular sieve comprises at least 0.020 mmol/g of silanol groups (e.g. at 0.030 mmol/g silanol groups). The amount of silanol groups can be measured using a K-uptake method, such as the K-uptake method described in the Examples. It has been found that when the molecular sieve, particularly the zeolite, contains a substantial number of silanol groups advantageous oxidation activity can be obtained.

The presence of silanol groups may be determined using FTIR spectroscopy.

The catalytic material of the invention may have an infrared spectrum comprising one or more absorption peak(s) [i.e. characteristic absorption peak(s) of the O—H stretching vibration] centered in a range of from 3000 cm$^{-1}$ to 3800 cm$^{-1}$. It is preferred that the infrared spectrum comprises one or more absorption peak(s) centered in a range of from 3000 cm$^{-1}$ to 3700 cm$^{-1}$, more preferably 3000 cm$^{-1}$ to 3600 cm$^{-1}$.

It may be preferable that the molecular sieve or zeolite comprises at least 0.010 mmol/g of silanol groups.

It is preferred that molecular sieve or zeolite comprises silanol groups, wherein the silanol groups have an on-set decomposition temperature≥500° C. The on-set decomposition temperature can be measured by differential scanning calorimetry.

A molecular sieve or zeolite having silanol groups can be obtained by removal of organic templates during the synthesis of the molecular sieve or zeolite, by the removal of germanium from the framework by a post-synthesis treatment or by removal of heteroatoms (e.g. Al, B, Ga, Zn, etc) from the molecular sieve or zeolite by a post-synthesis treatment. In some instances, the silanol groups may be an intrinsic part of the molecular sieve or zeolite framework.

Typically, the molecular sieve or zeolite is a solid. More preferably, the molecular sieve or zeolite is in a particulate form.

When the molecular sieve or zeolite is in a particulate form, then typically the molecular sieve or zeolite has a D50 of 0.1 to 20 microns (e.g. 5 to 15 microns), such as 0.2 to 15 microns (e.g. 0.2 to 10 microns or 7.5 to 12.5 microns). It is preferred that the D50 is 0.5 to 10 microns. For the avoidance of doubt, the D50 (i.e. median particle size) measurement can be obtained by Laser Diffraction Particle Size Analysis using, for example, a Malvern Mastersizer 2000. The measurement is a volume-based technique (i.e. D50 may also be referred to as $D_v50$ (or D(v,0.50))) and applies a mathematical Mie theory model to determine a particle size distribution.

It has been found that when the molecular sieve or zeolite has a small particle size distribution (i.e. a lower D50), then the catalytic material has higher activity and hydrothermal durability than a catalytic material comprising a molecular sieve or zeolite having a larger particle size distribution. Without wishing to be bound by theory, it is believed that the silanol group sites of the molecular sieve or zeolite are more accessible to the platinum group metal as the particle size of the molecular sieve or zeolite decreases. The catalytic material may, however, show better durability when the molecular sieve or zeolite has a larger particle size distribution.

The catalytic material of the invention comprises a platinum group metal (PGM) supported on the molecular sieve. Typically, the platinum group metal (PGM) is selected from the group consisting of platinum (Pt); palladium (Pd); rhodium (Rh); a combination of platinum (Pt) and palladium (Pd); a combination of palladium (Pd) and rhodium (Rh); a combination of platinum (Pt) and rhodium (Rh); and a combination of platinum (Pt), palladium (Pd) and rhodium (Rh).

The platinum group metal (PGM) is preferably selected from the group consisting of platinum (Pt), palladium (Pd) and a combination of platinum (Pt) and palladium (Pd). It is further preferred that the platinum group metal is selected from the group consisting of palladium (Pd), and a combination of platinum (Pt) and palladium (Pd). The platinum group metal may be palladium (Pd). Alternatively, the platinum group metal (PGM) may be a combination of platinum (Pt) and palladium (Pd). Excellent oxidation activity may be obtained when the catalytic material comprises palladium (Pd).

When the platinum group metal (PGM) is a combination of platinum (Pt) and palladium (Pd), then the combination of Pt and Pd may be selected from the group consisting of separately supported Pt and Pd, a mixture of Pt and Pd, an alloy of Pt and Pd, and both a mixture and an alloy of Pt and Pd. When the PGM is separately supported Pt and Pd, then the particles of Pt and Pd are supported on separate sites of the molecular sieve. The mixture or alloy of Pt and Pd is preferably bimetallic.

Typically, the molecular sieve comprises the platinum group metal (i.e. as defined above) as the only transition metal, preferably the only platinum group metal (i.e. no other platinum group metals may be present other than those explicitly recited).

The catalytic material may preferably consist essentially of (i) a platinum group metal (PGM) and/or an oxide thereof; and (ii) a molecular sieve as defined herein; wherein the platinum group metal (PGM) is selected from the group consisting of platinum (Pt), palladium (Pd) and a combination of platinum (Pt) and palladium (Pd).

In general, the catalytic material may comprise a total amount of the platinum group metal (PGM), preferably a total amount of the platinum group metal (PGM) supported on the molecular sieve, of 0.01 to 30 wt %. It is preferred that the total amount of the PGM, particularly the total amount of the PGM supported on the molecular sieve, is 0.1 to 20 wt %, such as 0.2 to 15 wt %.

It may be preferable that the total amount of the PGM (e.g. the total amount of PGM supported on the molecular sieve) is 6 to 30 wt %, more preferably 7.5 to 25 wt %, such as 10 to 20 wt %.

When the PGM comprises palladium (e.g. when palladium is present either singly or in combination with another metal), then the catalytic material typically comprises a total amount of palladium, preferably a total amount of palladium supported on the molecular sieve, of 0.01 to 20 wt % (e.g. 0.02 to 15 wt %). Preferably, the catalytic material comprises a total amount of palladium, particularly a total amount of palladium supported on the molecular sieve, of 0.1 to 15 wt %, such as 0.2 to 10 wt %. More preferably, the catalytic material comprises a total amount of palladium (e.g. the total amount of palladium supported on the molecular sieve) of 0.5 to 10 wt %, such as 0.75 to 7.5 wt %.

It may be preferable that the catalytic material typically comprises a total amount of palladium, preferably a total amount of palladium supported on the molecular sieve, of 4 to 20 wt % (e.g. 4.5 to 20 wt %), such as 5 to 17.5 wt %, more preferably 7.5 to 15 wt %.

The PGM is supported on the molecular sieve. The term "supported" in this context refers to PGM that is associated with the molecular sieve. Typically, the PGM is associated with (e.g. as an ion-association or as a covalent association) with the silanol groups of the molecular sieve. Without wishing to be bound by theory, it is believed that the active PGM sites are associated with silanol groups, such as silanol nest sites, and/or terminal Si—OH (or Si—O) groups, which may be present on an external surface and/or within a cavity of the molecular sieve.

Some of the PGM may be located insides the pores of the molecular sieve. The catalytic material may have at least 1% by weight (i.e. of the amount of PGM of the catalytic material) of the PGM located inside pores of the molecular sieve, preferably at least 5% by weight, more preferably at least 10% by weight. The amount of PGM inside the pores of the molecular sieve can be determined using conventional techniques or by the method described in SAE 2013-01-0531.

The catalytic material may have ≤75% by weight (i.e. of the amount of PGM of the catalytic material) of the PGM located inside pores of the molecular sieve, preferably ≤50% by weight.

The invention further provides an oxidation catalyst for treating methane/ethane or an exhaust gas produced by a natural gas (NG) engine. The oxidation catalyst comprises a catalytic material of the invention and a substrate. The oxidation catalyst may be prepared by applying a washcoat onto the surface of a substrate and/or by extrusion. The oxidation catalyst can be manufactured by preparing a washcoat and applying it onto a substrate using methods known in the art (see, for example, our WO 99/47260, WO 2011/080525 and WO 2014/195685). Methods of manufacturing oxidation catalysts by extrusion are also known (see, for example, our WO 2011/092519).

In one embodiment, the catalytic material is disposed or supported on the substrate (e.g. the catalytic material is applied to a surface of the substrate in a washcoat). The catalytic material may be disposed directly on to the substrate (i.e. the catalytic material is in contact with a surface of the substrate).

The oxidation catalyst may comprise a total loading of the catalytic material of 0.3 to 5.0 g in$^{-3}$, preferably 0.4 to 3.8 g in$^{-3}$, still more preferably 0.5 to 3.0 g in$^{-3}$ (e.g. 1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$).

The oxidation catalyst may comprise a first region and a second region. Typically, the first region is arranged to contact the exhaust gas after (e.g. most of) the exhaust gas has contacted and/or passed through the second region.

The second region typically comprises, or consists of, a sulfur trapping material. The first region comprises, or consists of, the catalytic material.

The first region may be a first layer or a first zone.

The second region may be a second layer or a second zone.

The oxidation catalyst may therefore comprise a first layer or zone and a second layer or zone. The first layer or zone may comprise, or consist of, the catalytic material. The second layer or zone may comprise, or consist of, a sulfur trapping material, such as a sulfur trapping material as described below for the sulfur trap or, for example, manganese supported on alumina.

When the oxidation catalyst comprises a first layer and a second layer, it is preferred that the first layer is disposed or supported on the substrate (e.g. directly disposed or supported on the substrate) and the second layer is disposed or supported on the first layer (e.g. the second layer is directly disposed or supported on the first layer). In this arrangement, the first layer contacts the exhaust gas after most of the exhaust gas has contacted and/or passed through second layer.

When the oxidation catalyst comprises a first zone and a second zone, then preferably the first zone is disposed or supported near or at an outlet end of the substrate. More preferably, the second zone is disposed or supported near or at an inlet end of the substrate. The first zone contacts the exhaust gas after the exhaust gas has contacted and/or passed through second zone.

In a first oxidation catalyst arrangement, the first region is a first zone and the second region is a second zone. It is preferred that the first zone is disposed or supported at or near an outlet end of the substrate. More preferably, the second zone is disposed or supported at or near an inlet end of the substrate.

The first zone and/or the second zone may be disposed directly onto the substrate (i.e. each of the first zone and/or the second zone is in direct contact with a surface of the substrate).

The first zone and/or the second zone may be disposed or supported on a third region.

In a second oxidation catalyst arrangement, the first region is a first layer and the second region is a second layer. It is preferred that the second layer is disposed or supported on the first layer (e.g. the second layer is directly disposed or supported on the first layer).

The first layer may be disposed directly onto the substrate (i.e. the first layer is in direct contact with a surface of the substrate). Additionally or alternatively, the first layer may be disposed directly onto a third region.

In a third oxidation catalyst arrangement, the first region is a first layer and the second region is a second zone. It is preferred that the second zone is disposed or supported (e.g. directly disposed or supported) on the first layer. More preferably, the second zone is disposed or supported (e.g. directly disposed or supported) on the first layer at or near an inlet end of the substrate.

The first layer may be disposed directly onto the substrate (i.e. the first layer is in direct contact with a surface of the substrate). Additionally or alternatively, the first layer may be disposed directly onto a third region.

In general, and particularly in the second and third oxidation catalyst arrangements, the first layer typically extends for an entire length (i.e. substantially an entire length) of the substrate, particularly the entire length of the channels of a substrate monolith.

Generally, and particularly in the second oxidation catalyst arrangement, the second layer typically extends for an entire length (i.e. substantially an entire length) of the substrate, preferably the entire length of the channels of a substrate monolith.

Generally, and particularly in the first oxidation catalyst arrangement and the third oxidation catalyst arrangement, the second zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In general, and particularly in the first oxidation catalyst arrangement, the first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the first oxidation catalyst arrangement, it is preferred that the length of the second zone is less than the length of the first zone.

In the third oxidation catalyst arrangement, it is preferred that the length of the second zone is less than 50% of the length of the substrate and/or the first layer.

Substrates for supporting oxidation catalysts for treating exhaust gases, such as from internal combustion engines, are well known in the art.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith), preferably a honeycomb monolith. Such monoliths are well-known in the art.

The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In the oxidation catalyst above, the catalytic material is disposed on the substrate. Additionally or alternatively, the catalytic material may be dispersed in the substrate (e.g. the catalytic material is part of an extrudate that is used to form the substrate). Thus, the substrate is an extruded solid body comprising the catalytic material.

It is possible that when the catalytic material is dispersed in the substrate (e.g. the oxidation catalyst is an extruded product) that the resulting oxidation catalyst may outperform an oxidation catalyst where the same catalytic material is washcoated onto the substrate. When the catalytic material is dispersed in the substrate (e.g. the oxidation catalyst is an extruded product), then it may be possible to rapidly desulfate the oxidation catalyst and it may have excellent on-stream stability (e.g. good water and oxygen tolerance) in comparison to an oxidation catalyst that has been manufactured by washcoating the catalytic material onto the substrate.

The extruded solid body typically comprises, or consists essentially of, (i) 5 to 95% by weight of the catalytic material and (ii) 5 to 95% of at least one component selected from the group consisting of a binder/matrix component, an inorganic fibre and a combination thereof.

The binder/matrix component can be selected from the group consisting of cordierite, a nitride, a carbide, a boride, a spinel, a refractory metal oxide, lithium aluminosilicate, zircon and mixtures of any two or more thereof.

The refractory metal oxide may be selected from the group consisting of optionally doped alumina, silica, titania, zirconia, and mixtures of any two or more thereof. Suitable sources of silica, such as clays, are described in US 2014/0065042 A1.

The inorganic fibre may be selected from the group consisting of a carbon fibre, a glass fibre, a metal fibre, a boron fibre, an alumina fibre, a silica fibre, a silica-alumina fibre, a silicon carbide fibre, a potassium titanate fibre, an aluminium borate fibre and a ceramic fibre.

When the catalytic material is dispersed in the substrate (e.g. the substrate is an extruded solid body comprising the catalytic material), then typically the substrate has a porosity of 35 to 75%. The porosity of the substrate can be determined using conventional methods known in the art, such as mercury porosimetry.

In general, the substrate may be a flow-through substrate or a filtering substrate. When the substrate is a monolith, then the substrate may be a flow-through monolith or a filtering monolith.

A flow-through substrate typically comprises a honeycomb substrate (e.g. a metal or ceramic honeycomb substrate) having a plurality of channels extending therethrough, which channels are open at both ends.

A filtering substrate generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the substrate is a filtering substrate, it is preferred that the filtering substrate is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytic material to the exhaust gas.

The invention also provides an exhaust system for treating an exhaust gas, typically produced by an engine as defined below, which contains methane/ethane. The exhaust system comprises an oxidation catalyst of the invention.

The exhaust system of the invention may comprise a plurality of oxidation catalysts of the invention. The plurality of oxidation catalysts may be arranged in the exhaust system in series and/or parallel. It is preferred that the exhaust system comprises two oxidation catalysts of the invention, such as a first oxidation catalyst and a second oxidation catalyst.

The first oxidation catalyst and the second oxidation catalyst may be arranged in series in the exhaust system, preferably with the first oxidation catalyst upstream (e.g. directly upstream) of the second oxidation catalyst. The composition and/or structure of the first oxidation catalyst and the second oxidation catalyst may be the same or different.

When the first oxidation catalyst and the second oxidation catalyst are in series, then the exhaust system may further comprise an emissions control device, such as described below, which is preferably downstream of the second oxidation catalyst. The exhaust system may be an exhaust system as described below in any one of the first to fourth exhaust system embodiments of the invention where any reference to "the oxidation catalyst" refers to the first oxidation catalyst and the second oxidation catalyst in series.

Figure 9:
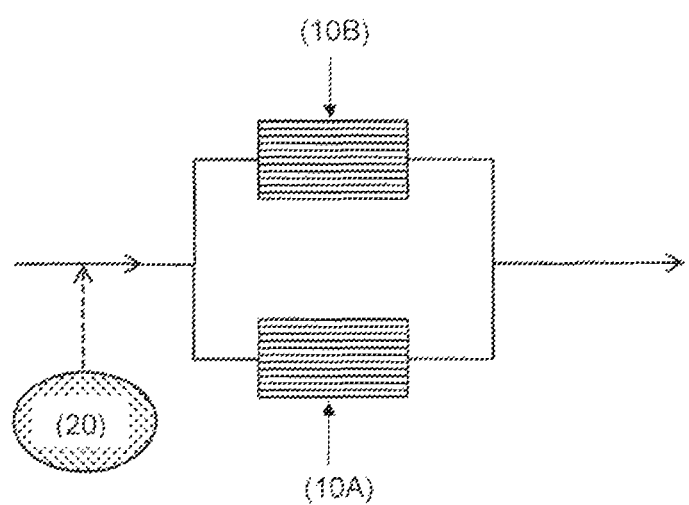
FIG. 9 shows an exhaust system of the invention. The exhaust system comprises two oxidation catalysts (10A, 10B) of the invention. The oxidation catalysts are arranged in parallel within the exhaust system. A hydrocarbon injector (20) may be located upstream of both oxidation catalysts (e.g. upstream of the parallel arrangement of oxidation catalysts).

The first oxidation catalyst and the second oxidation catalyst may be arranged in parallel (see, for example, FIG. 9). It is preferred that the exhaust system may comprise means for switching the flow of exhaust gas between the first oxidation catalyst and the second oxidation catalyst. The means for switching the flow of the exhaust gas preferably only allows the exhaust gas to pass through one (e.g. only one) oxidation catalyst of the invention selected from the group consisting of the first oxidation catalyst and the second oxidation catalyst. Such means for switching the flow of exhaust gas are well known in the art.

The means for switching the flow of the exhaust gas may comprise a first valve and a second valve. The first valve may be located at a junction between the inlet end of the first oxidation catalyst and the inlet end of the second oxidation catalyst. The second valve may be located at a junction between the outlet end of the first oxidation catalyst and the outlet end of the second oxidation catalyst.

When the first oxidation catalyst and the second oxidation catalyst are arranged in parallel, the exhaust system may further comprise a sensor for detecting hydrocarbons (e.g. $CH_4$) and/or a sensor for detecting oxygen. The sensor(s) may be located downstream of the first oxidation catalyst and the second oxidation catalyst, such as downstream of the junction between the outlet end of the first oxidation catalyst and the outlet end of the second oxidation catalyst.

The parallel arrangement of oxidation catalysts of the invention is advantageous when the fuel contains a substantial quantity of a sulfur-containing impurity. This exhaust system arrangement permits the continuous use of at least one oxidation catalyst, whilst at least one of the other oxidation catalysts in a bypass section of the exhaust system is subjected to a desulphation step to regenerate its activity.

It is generally preferable that the exhaust system comprises a single oxidation catalyst of the invention.

Additionally or alternatively, the exhaust system may further comprise an emissions control device. When the exhaust system further comprises an emissions control device, the oxidation catalyst may be disposed upstream of the emissions control device (i.e. the exhaust system is arranged to bring the exhaust gas into contact with the oxidation catalyst before the emissions control device).

The exhaust system may further comprise a plurality of emissions control devices. It may be necessary to include several types of emissions control device in the exhaust system for certain types of engine. When the exhaust system further comprises a plurality of emissions control devices, then it is preferable that the oxidation catalyst is disposed upstream of the plurality of emissions control devices (i.e. the exhaust system is arranged to bring the exhaust gas into contact with the oxidation catalyst before the plurality of emissions control devices). Thus, exhaust gas is first brought into contact with the oxidation catalyst of the invention before any other emissions control device.

The exhaust system may further comprise a turbocharger. The turbocharger may be an exhaust-driven turbocharger.

The oxidation catalyst may be disposed upstream of the turbocharger. Thus, the exhaust system is arranged to bring the exhaust gas into contact with the oxidation catalyst before the turbocharger. It may be preferable that the oxidation catalyst is disposed directly upstream of the turbocharger (i.e. an emissions control device is not disposed between the oxidation catalyst and the turbocharger).

Alternatively, the oxidation catalyst may be disposed downstream of the turbocharger. Thus, the exhaust system is arranged to bring the exhaust gas into contact with the turbocharger before the oxidation catalyst. It may be preferable that the oxidation catalyst is disposed directly downstream of the turbocharger (i.e. an emissions control device is not disposed between the turbocharger and the oxidation catalyst).

When the exhaust system comprises an emissions control device or a plurality of emissions control devices, then the emissions control device or each emission control device (when there is a plurality) may be selected from the group consisting of a particulate filter, a lean NO trap (LNT), a lean NO catalyst (LNC), a selective catalytic reduction (SCR) catalyst, a diesel oxidation catalyst (DOC), a three-way catalyst (TWC), a catalysed soot filter (CSF), a selective catalytic reduction filter (SCRF™) catalyst, an ammonia slip catalyst (ASC) and a gasoline particulate filter (GPF). Such emissions control devices are all well known in the art.

It is preferred that the emissions control device or at least one emissions control device (i.e. when there is a plurality) is selected from the group consisting of a particulate filter, a selective catalytic reduction (SCR) catalyst, a catalysed soot filter (CSF) and a selective catalytic reduction filter (SCRF™) catalyst. More preferably, the emissions control device or at least one emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia or an ammonia precursor (e.g. urea or ammonium formate, preferably urea), into exhaust gas downstream of the oxidation catalyst and upstream of the SCR catalyst or the SCRF™ catalyst. Such an injector may be fluidly linked to a source (e.g. a tank) of a nitrogenous reductant precursor.

Alternatively or in addition to the injector for injecting a nitrogenous reductant, ammonia can be generated in situ (e.g. during rich regeneration of a LNT disposed upstream of the SCR catalyst or the SCRF™ catalyst). Thus, the apparatus, vehicle or engine thereof may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or a molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5M/O_3/TiO_2$, $WO_x/CeZrO_2$, $WO_x/ZrO_2$ or $Fe/WO_x/ZrO_2$).

The molecular sieve of the SCR catalyst or the SCRF™ catalyst may comprise a zeolite, preferably the zeolite is an aluminosilicate zeolite or a silico-aluminophosphate (SAPO) zeolite.

Typically, the zeolite is a small pore zeolite (e.g. CHA), a medium pore zeolite (e.g. ZSM-5) or a large pore zeolite (e.g. beta). Small pore molecular sieves are potentially advantageous for use in SCR catalysts or SCRF™ catalyst.

The molecular sieve of the SCR catalyst or the SCRF™ catalyst is preferably an aluminosilicate zeolite having a SAR of about 10 to about 50, such as about 15 to about 40. The aluminosilicate zeolite is preferably selected from the group consisting of AEI, ZSM-5, ZSM-20, ERI (including ZSM-34), mordenite, ferrierite, BEA (including Beta), Y, CHA, LEV (including Nu-3), MCM-22 and EU-1. More preferably, the aluminosilicate zeolite is AEI or CHA.

In a first exhaust system embodiment, the exhaust system comprises the oxidation catalyst of the invention and a catalysed soot filter (CSF). The oxidation catalyst is typically followed by (e.g. is upstream of) the catalysed soot filter (CSF).

A second exhaust system embodiment relates to an exhaust system comprising the oxidation catalyst of the invention, a catalysed soot filter (CSF) and a selective catalytic reduction (SCR) catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third exhaust system embodiment, the exhaust system comprises the oxidation catalyst of the invention, a selective catalytic reduction (SCR) catalyst and either a catalysed soot filter (CSF) or a particulate filter. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the particulate filter.

A fourth exhaust system embodiment comprises the oxidation catalyst of the invention and a selective catalytic reduction filter (SCRF™) catalyst. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In each of the second to fourth exhaust system embodiments described hereinabove, an ASC can be disposed downstream from the SCR catalyst or the SCRF™ catalyst. The ASC may have a separate substrate to the SCR catalyst or the SCRF™ catalyst. Additionally or alternatively, the ASC may share a substrate with the SCR catalyst or the SCRF™ catalyst (i.e. the ASC and either the SCR catalyst or the SCRF™ catalyst are an integral emissions control device). The ASC is provided by a layer or zone for oxidising ammonia, which is disposed on a downstream or trailing end of the substrate.

The exhaust system, including the exhaust system embodiments above, may further comprise a sulfur trap upstream of the oxidation catalyst. The sulfur trap may be directly upstream of the oxidation catalyst (i.e. there is no emissions control device and/or a turbocharger located between the sulfur trap and the oxidation catalyst. Sulfur traps are known in the art.

The exhaust system may comprise a sulfur trap when the oxidation catalyst of the invention comprises a sulfur trapping material, such as in any one of the first to third oxidation catalyst arrangements described above.

The oxidative activity of many conventional oxidation catalysts toward methane and ethane deteriorates when sulfur containing impurities are present in the exhaust gas. Many of these catalysts contain a support material (e.g. refractory oxide) that undergoes sulfation when sulfur containing impurities are present in the exhaust gas. It is sometimes possible to recover the oxidative activity of the catalyst by heating the catalyst up to high temperatures, typically about 850° C., or by exposing the catalyst to a reducing environment, such as by introducing a reductant into the exhaust gas.

In contrast, any deterioration in performance of the oxidation catalyst of the invention can be recovered by heating the catalyst to much lower temperatures, such as around 500° C., in lean conditions. These low desulfation temperatures permit the use of several exhaust system configurations that include a sulfur trap. These configurations can ensure excellent operation of the oxidation catalyst of the invention over the exhaust system's lifetime.

Typically, the sulfur trap comprises, or consists of, a substrate and a sulfur trapping material. The sulfur trapping material is disposed or supported on the substrate and/or is dispersed in the substrate (e.g. the sulfur trap material is part of an extrudate that is used to form the substrate). It is preferred that the sulfur trapping material is disposed or supported on the substrate. The substrate of the sulfur trap may be referred to herein as the "sulfur trap substrate".

The sulfur trap substrate is typically a substrate as defined above for the oxidation catalyst. It is preferred that the sulfur trap substrate is a flow-through substrate.

The sulfur trap substrate is preferably a monolith. When the sulfur trap substrate is a monolith, then preferably the substrate is a flow-through monolith.

The sulfur trapping material typically comprises, or consists essentially of, a refractory oxide for trapping at least one impurity comprising sulfur and/or a molecular sieve for trapping at least one impurity comprising sulfur.

In principle, any refractory oxide that undergoes sulfation in the exhaust gas produced by a natural gas engine may be used as the refractory oxide for trapping at least one impurity comprising sulfur. Such refractory oxides are known in the art.

When the sulfur trapping material comprises, or consists essentially of, a refractory oxide for trapping at least one impurity comprising sulfur, then the refractory oxide may be selected from the group consisting of alumina ($Al_2O_3$), zirconia ($ZrO_2$), magnesium aluminate ($MgAl_2O_3$), cerium oxide ($CeO_2$), barium oxide (BaO), calcium oxide (CaO) and a combination of any two or more thereof.

When the sulfur trapping material comprises, or consists essentially of, a molecular sieve for trapping at least one impurity comprising sulfur, then the molecular sieve has an aluminosilicate framework, an aluminophosphate framework or a silico-aluminophosphate framework. It is preferred that the molecular sieve has an aluminosilicate framework. When the molecular sieve has an aluminosilicate framework, then the molecular sieve is preferably a zeolite.

When the molecular sieve has an aluminosilicate framework or a silico-aluminophosphate framework, then the molecular sieve typically has a silica to alumina molar ratio (SAR) of 10 to 200 (e.g. 10 to 40), such as 10 to 100, more preferably 15 to 80 (e.g. 15 to 30).

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). It is preferred that the molecular sieve is a medium pore molecular sieve or a large pore molecular sieve. More preferably, the molecular sieve is a large pore molecular sieve. It is believed that impurities comprising sulfur are more easily able to access the inner structure of molecular sieves having a larger pore size thereby facilitating their capture.

Typically, the sulfur trapping material further comprises a sulfur trapping compound (e.g. in addition to the refractory oxide and/or the molecular sieve).

The sulfur trapping compound may comprise, or consist essentially of, a metal or an oxide thereof, wherein the metal is selected from the group consisting of platinum (Pt), palladium (Pd), manganese (Mn), copper (Cu), nickel (Ni), barium (Ba), calcium (Ca), cerium (Ce) and a combination of two or more thereof (e.g. a mixed oxide, such as a binary mixed oxide). More preferably, the metal is selected from the group consisting of copper (Cu), nickel (Ni), barium (Ba), calcium (Ca), cerium (Ce) and a combination of two or more thereof.

When the sulfur trapping material comprises, or consists essentially of, a refractory oxide for trapping at least one impurity comprising sulfur, then the sulfur trapping compound is typically supported on the refractory oxide. Thus, a plurality of particles of the sulfur trapping compound may be supported on each particle of the refractory oxide.

When the sulfur trapping material comprises, or consists essentially of, a molecular sieve for trapping at least one impurity comprising sulfur, then the sulfur trapping compound is typically supported on the molecular sieve. For example, the sulfur trapping compound may be loaded onto and supported on the molecular sieve, such as by ion-exchange.

The sulfur trap may preferably comprise a sulfur trapping material disposed or supported on a substrate, particularly a flow-through substrate. The sulfur trapping material may comprise, or consist essentially of, manganese supported on alumina.

Figure 7:
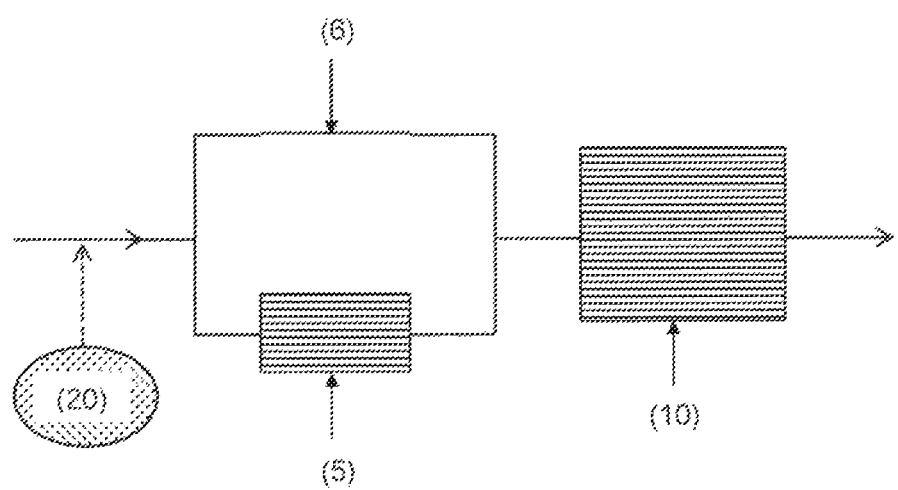
FIG. 7 shows an exhaust system of the invention. The exhaust system comprises an oxidation catalyst of the invention (10), which is arranged downstream of a sulfur trap (5). The exhaust system also contains a bypass (6) to allow exhaust gas to flow to the oxidation catalyst without passing through the sulfur trap. A hydrocarbon injector (20) may be located upstream of the sulfur trap (5).

The exhaust system of the invention may comprise an exhaust gas conduit for bypassing the sulfur trap (see, for example, FIG. 7). When the exhaust system comprises an exhaust gas conduit for bypassing the sulfur trap, then the exhaust system may further comprise means for switching the flow of exhaust gas between the sulfur trap and the bypass conduit. The means for switching the flow of the exhaust gas preferably only allows the exhaust gas to pass through either the sulfur trap or the bypass conduit. Such an exhaust system allows the sulfur trap to be desulfated in isolation from the rest of the exhaust system or can be used when it is necessary to recover the performance of the oxidation catalyst after it has reached a reduced hydrocarbon conversion level.

The exhaust system of the invention may comprise a single sulfur trap. Alternatively, the exhaust system of the invention may comprise a plurality of sulfur traps, preferably two sulfur traps, such as a first sulfur trap and a second sulfur trap.

Figure 6:
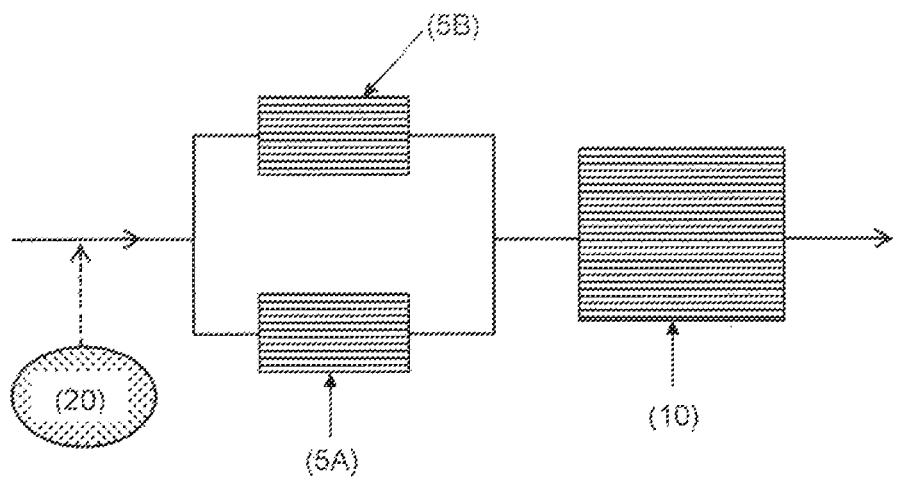
FIG. 6 shows an exhaust system of the invention. The exhaust system comprises an oxidation catalyst of the invention (10), which is arranged downstream of two sulfur traps (5A, 5B). Sulfur traps (5A, 5B) are arranged in parallel upstream of the oxidation catalyst. A hydrocarbon injector (20) may be located upstream of the sulfur traps (5A, 5B).

The first sulfur trap and the second sulfur trap may be arranged in parallel (see, for example, FIG. 6). When the first sulfur trap and the second sulfur trap are arranged in parallel, it is preferred that both the first sulfur trap and the second sulfur trap (e.g. the parallel arrangement of sulfur traps) is upstream of the oxidation catalyst of the invention.

When the first sulfur trap and the second sulfur trap are arranged in parallel, it is preferred that the exhaust system comprises means for switching the flow of exhaust gas between the first sulfur trap and the second sulfur trap. The means for switching the flow of the exhaust gas preferably only allows the exhaust gas to pass through one (e.g. only one) sulfur trap elected from the group consisting of the first sulfur trap and the second sulfur trap.

The means for switching the flow of exhaust gas is preferably a valve, more preferably a plurality of valves. The means for switching the flow of the exhaust gas may comprise a first valve and a second valve. The first valve may be located at a junction between the inlet end of the first sulfur trap and the inlet end of the second sulfur trap or the junction between the inlet end of the sulfur trap and the exhaust gas conduit for bypassing the sulfur trap. The second valve may be located at a junction between the outlet end of the first sulfur trap and the outlet end of the second sulfur trap or the junction between the outlet end of the sulfur trap and the exhaust gas conduit for bypassing the sulfur trap.

The parallel arrangement of sulfur traps is advantageous because it allows one of the sulfur traps to be desulfated in isolation from the rest of the exhaust system, particularly the other sulfur trap.

In general, when the exhaust system of the invention comprises a sulfur trap, including a first sulfur trap and a second sulfur trap as described above, then the exhaust system may further comprise an emissions control device, such as described above, which is preferably downstream of the oxidation catalyst. The exhaust system may be an exhaust system as described above in any one of the first to fourth exhaust system embodiments.

As a general feature of the exhaust system of the invention, the exhaust system may further comprise means for introducing hydrocarbons (HCs) into the exhaust gas. The term "means for introducing hydrocarbons into the exhaust gas" is referred to herein by the abbreviated expression "HC means". The term "introducing hydrocarbons into the exhaust gas" refers to the additional inclusion of hydrocarbons into the exhaust gas (i.e. in addition to any hydrocarbons that may be present from the natural gas engine).

In general, the HC means is configured to introduce hydrocarbons into the exhaust gas upstream of the oxidation catalyst of the invention, and preferably upstream of the sulfur trap. When the exhaust system comprises a first sulfur trap and a second sulfur trap (e.g. in a parallel), then preferably the HC means is upstream of both the first sulfur trap and the second sulfur trap. When the exhaust system comprises a sulfur trap and an exhaust gas conduit for bypassing the sulfur trap, then preferably the HC means is upstream of both the sulfur trap and the exhaust gas conduit for bypassing the sulfur trap.

It is preferred that the HC means is configured to controllably introduce an amount of hydrocarbon into the exhaust gas upstream of the oxidation catalyst, and optionally upstream of the sulfur trap(s). In principle, any HC means known in the art can be used to provide this function.

The HC means may be an injector or a reformer catalyst for generating hydrocarbons or fuel. Such reformer catalysts are known in the art. It is preferred that the HC means is an injector, preferably an injector suitable for injecting fuel or hydrocarbons into the exhaust gas. More preferably, the injector is configured to controllably inject an amount of fuel or hydrocarbons into the exhaust gas.

When the HC means is an injector, then the HC means is preferably connected to an exhaust gas conduit, such as between the outlet of the engine exhaust manifold and the inlet of the oxidation catalyst, more preferably between the outlet of the engine exhaust manifold and the inlet(s) of the sulfur trap(s).

The exhaust system or vehicle of the invention may further comprise a hydrocarbon supply apparatus. The hydrocarbon supply apparatus is preferably connected or coupled to the injector.

The hydrocarbon supply apparatus may comprise a hydrocarbons (HCs) conduit to supply hydrocarbon to the HC means, particularly when the HC means is an injector. The HCs conduit is coupled, preferably fluidly coupled, to an engine or a fuel tank (e.g. the engine or the fuel tank of the vehicle).

The HC means and/or the hydrocarbon supply apparatus may be electronically coupled to an engine management system, particularly when the HC means is an injector and the hydrocarbon supply apparatus comprises a HCs conduit coupled to an engine or a fuel tank, preferably to an engine. The engine management system may be configured to trigger the HC means to inject hydrocarbon into the exhaust gas, preferably to purge or regenerate the oxidation catalyst of the invention and/or a sulfur trap.

The exhaust system of the invention may further comprise an exhaust gas sensor. The exhaust gas sensor is preferably disposed downstream of the oxidation catalyst (e.g. at or after an outlet of the oxidation catalyst).

Generally, the engine management system is coupled to a sensor in the exhaust system.

Such a sensor may be disposed downstream, preferably directly downstream, of the oxidation catalyst. The sensor may be used to monitor the status of the oxidation catalyst. The sensor may be a hydrocarbons (HCs) sensor (e.g. to monitor the content of hydrocarbons (HCs) of the exhaust gas at the outlet of the oxidation catalyst).

Figure 8:
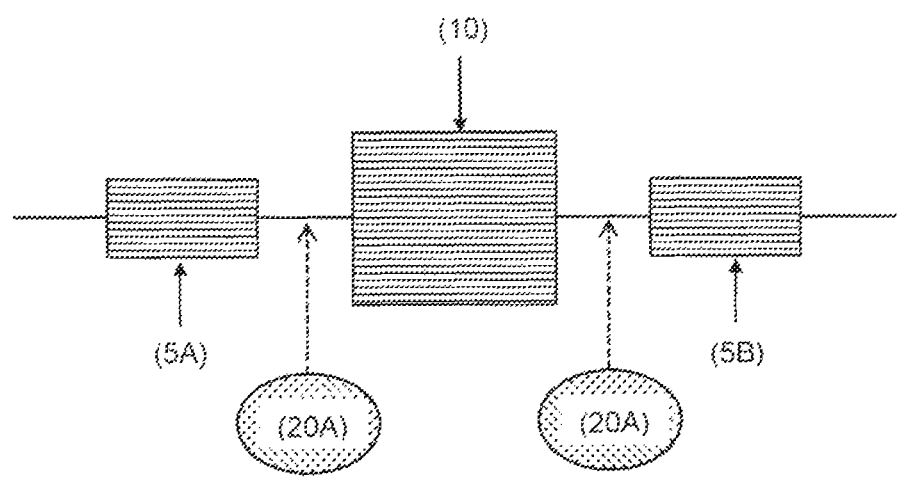
FIG. 8 shows an exhaust system of the invention. The exhaust system is a reversing flow system whereby exhaust gas can be passed through the system from either end. The exhaust system comprises an oxidation catalyst (10) of the invention, which is located between two sulfur traps (5A, 5B). There is a sulfur trap at each end of the oxidation catalyst. There may be a hydrocarbon injector (20A, 20B) located between each sulfur trap (5A, 5B) and the end of the oxidation catalyst (10).

The exhaust system of the invention may be a reverse flow exhaust system. The exhaust system may comprise a plurality of sulfur traps, preferably two sulfur traps, such as a first sulfur trap and a second sulfur trap. The first sulfur trap may be coupled to a first end of the oxidation catalyst of the invention and the second sulfur trap may be coupled to a second end (e.g. opposite to the first end) of the oxidation catalyst. See, for example, FIG. 8. A first HC means may be disposed between the first sulfur trap and a first end of the oxidation catalyst and a second HC means may be disposed between the second sulfur trap and a second end of the oxidation catalyst.

Another aspect of the invention relates to an apparatus (e.g. for a power plant). The apparatus may comprise an engine, such as a natural gas turbine or an engine as described below.

The invention also relates to a vehicle, which comprises an internal combustion engine. The internal combustion engine is typically a natural gas (NG) engine. When the vehicle comprises a natural gas (NG) engine, then the vehicle is a natural gas vehicle (NGV).

The natural gas (NG) engine may be a dedicated NG engine (i.e. purpose built for using natural gas as a fuel) or a modified engine (i.e. an engine, such as a conventional gasoline or diesel engine, modified to use natural gas as a fuel). The modified engine is typically configured to use natural gas as a fuel or the modified engine comprises hardware to allow the use of natural gas as a fuel. This hardware is generally not present in conventional gasoline or diesel engines. The modified engine may be a dual fuel engine.

The internal combustion engine may be a lean burn internal combustion engine. The lean burn internal combustion engine may be a spark ignition engine or a compression ignition engine.

The natural gas (NG) engine may be a liquefied natural gas (LNG) engine or a compressed natural gas engine, preferably the NG engine is a compressed natural gas (CNG) engine. More preferably, the NG engine is a lean-burn compressed natural gas (lean-burn CNG) engine.

A problem with using NG as a fuel is that NG has a high octane number and a low cetane number. Several engine designs are known that allow the use of NG as a fuel.

The internal combustion engine may be a spark ignition natural gas (SING) engine, a direct injection natural gas (DING) engine or a dual fuel natural gas (DFNG) engine. SING engines utilise the Otto cycle, whereas DING and DFNG engines utilise the Diesel cycle.

The internal combustion engine may be a SING engine. The SING engine may be a lean burn SING engine or a stoichiometric SING engine. It is preferred that the SING engine is a lean burn SING engine.

When the internal combustion engine is a SING engine and exhaust system further comprises an emissions control device, then preferably the emissions control device is a three-way catalyst (TWC) or a gasoline particulate filter (GPF).

Alternatively, the internal combustion engine may be a DING engine. The DING engine may comprise a glow plug (e.g. as an ignition source) or an injection system for the pilot injection of diesel fuel. When the DING engine comprises an injection system for the pilot injection of diesel fuel, then preferably the DING engine is not a dual fuel engine. The injection system allows the use of a small quantity of diesel fuel as an ignition source and it does not have the capability to inject large quantities of diesel fuel.

As a further alternative, the internal combustion engine may be a DFNG engine. The DFNG engine is typically configured to mix natural gas (NG) with intake air before induction to a cylinder of the engine.

Typically, the DFNG engine is a dual fuel engine. The DFNG engine may be configured or configurable to operate in a first mode, where diesel is the only fuel, and a second mode, where a mixture of natural gas and diesel is the fuel.

The vehicle may be a light-duty vehicle (LDV), such as defined in US or European legislation. A light-duty vehicle typically has a weight of <2840 kg, more preferably a weight of <2610 kg.

In the US, a light-duty vehicle (LDV) refers to a vehicle having a gross weight of ≤8,500 pounds (US lbs). In Europe, the term light-duty vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty vehicle (HDV), such as a vehicle having a gross weight of >8,500 pounds (US lbs), as defined in US legislation.

The invention also provides a method of treating an exhaust gas containing methane. The method comprises, or consists of, contacting the exhaust gas with either a zeolite catalyst of the invention or an oxidation catalyst of the invention. The step of contacting the exhaust gas with the zeolite catalyst or the oxidation catalyst may be provided by passing the exhaust through an exhaust system of the invention.

The invention also provides methods for the manufacture of an oxidation catalyst.

It has been found that the washcoat formulation that is used to apply the catalytic material onto a surface of the substrate can affect the activity of the catalytic material. It is believed that the catalytic material suffers severe deactivation when an alkali metal is present, such as from the rheology modifier, the binder and/or the acid/base used to adjust the pH. The presence of alumina in the washcoat may also deactivate the catalytic material.

It is preferred that the washcoat (e.g. the washcoat comprising the catalytic material) does not comprise a rheology modifier. When a rheology modifier is included in the washcoat, it has unexpectedly been found that substantial deactivation of the catalytic material can occur.

Rheology modifiers for washcoats are well known in the art. Examples of rheology modifiers for washcoats include galactomanna gum, guar gum, xanthan gum, curdlan, schizophyllan, scleroglucan, diutan gum, whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The step of (i) preparing a washcoat comprising a catalytic material preferably does not include a step of adding a strong base, particularly a strong base selected from sodium hydroxide and potassium hydroxide. Significant deactivation of the catalytic material may occur when a strong base comprising an alkali metal cation, such as NaOH or KOH, is included in the washcoat.

The washcoat may or may not further comprise a binder. When the washcoat comprises a binder, then the binder may comprise silica or alumina (e.g. colloidal silica or colloidal alumina). Preferably, the binder comprises silica (e.g. colloidal silica).

The binder may be a base-stabilised binder or an acid-stabilised binder. Acid-stabilised and base-stabilised binders for washcoats are well known in the art.

The base-stabilised binder may be a base-stabilised silica binder. The acid-stabilised binder may be an acid-stabilised alumina binder or an acid-stabilised silica binder.

It is preferred that the binder is a base-stabilised binder. More preferably, the washcoat comprises a single binder, which is a base-stabilised binder.

The washcoat may further comprise a base-stabilised silica binder and an acid-stabilised alumina binder. The washcoat typically comprises an amount of the acid-stabilised alumina binder of ≤3 wt % (e.g. of the total washcoat loading). The washcoat comprises an amount of the base-stabilised silica binder that is greater than the amount of the acid-stabilised alumina binder. The acid-stabilised alumina binder is a secondary binder.

In general, the washcoat may further comprise a base, preferably a base that does not comprise an alkali metal cation and/or an alkaline earth metal cation.

The base may be added to bring the pH of the washcoat up to ≥5. When the washcoat comprises a binder, particularly an acid stabilised binder, then preferably a base may be added to the washcoat to bring the pH of the washcoat up to ≥5.

The base may comprise a hydroxide anion and an organic cation (i.e. XOH, where X represents the organic cation). The term "organic cation" as used herein refers to a cationic organic compound, such as a quarternary ammonium compound or a heterocyclic compound having a quarternary nitrogen atom.

It may be preferable that the washcoat consists essentially of a slurry of the catalytic material, more preferably an aqueous slurry of the catalytic material.

As indicated above, step (ii) can be performed using methods known in the art (see, for example, our WO 99/47260, WO 2011/080525 and WO 2014/195685). It is particularly preferred that step (ii) is performed using the method described in WO 2014/195685.

The step of (ii) applying the washcoat to the substrate is preferably by (a) holding the substrate vertically; (b) introducing the washcoat into the substrate through the open ends of the channels at a lower end of the substrate; and (c) after the lower end of the substrate has been part-filled with the washcoat, applying a vacuum to the open ends of the channels at the upper end of the substrate while introducing the washcoat into the substrate.

In the method of manufacturing an oxidation catalyst of the invention, the substrate may comprise a sulfur trapping material (e.g. the substrate may have been pre-coated). The substrate may comprise (i.e. have been coated with) a second region comprising the sulfur trapping material.

Definitions

The acronym "SAR" as used herein stands for silica to alumina ratio and refers to a molar ratio of silica to alumina.

The expression "treating" as used herein with reference to methane/ethane or an exhaust gas containing methane/ethane refers to oxidising methane/ethane.

Methane/ethane is/are "treated" because it is converted by oxidation to water ($H_2O$) and carbon dioxide ($CO_2$), when complete oxidation occurs.

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "upstream" as used herein with reference to the location of a first device in relation to a second device (the device may, for example, be an oxidation catalyst, a turbocharger or an emissions control device) refers to an arrangement where the exhaust gas outlet of the first device is coupled (e.g. by a conduit) to the exhaust gas inlet of the second device.

The term "downstream" as used herein with reference to the location of a first device in relation to a second device refers to an arrangement where the exhaust gas inlet of the first device is coupled (e.g. by a conduit) to the exhaust gas outlet of the second device.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "about" as used herein with reference to an end point of a numerical range includes the exact end point of the specified numerical range. Thus, for example, an expression defining a parameter as being up to "about 0.2" includes the parameter being up to and including 0.2.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

EXAMPLES

The invention will now be illustrated by the following non-limiting examples.

Example 1

A powder sample of siliceous BEA zeolite having 0.13 mol % of heteroatom was impregnated with a solution of palladium nitrate and platinum nitrate by a conventional incipient wetness technique. After impregnation, the zeolite was dried at 100° C. in air in a static oven for 5 hours and then calcined in air at 500° C. in a static oven for 2 hours. The resulting zeolite catalyst powder (i.e. PtPd/BEA) contained 0.15 wt % Pt and 2.85 wt % of Pd.

Example 2

The method in Example 1 was repeated using a siliceous BEA zeolite having 1.10 mol % of heteroatom instead of 0.13 mol % to produce a zeolite catalyst powder (i.e. PtPd/BEA) containing 0.15 wt % Pt and 2.85 wt % of Pd.

Example 3

The method in Example 1 was repeated using a siliceous BEA zeolite having 6.67 mol % of heteroatom instead of 0.13 mol % to produce a zeolite catalyst powder (i.e. PtPd/BEA) containing 0.15 wt % Pt and 2.85 wt % of Pd.
Experimental Results
Catalyst Ageing Powder forms of each of the zeolite catalysts of Examples 1 to 3 were loaded into a ceramic crucible and placed in a flow-through quartz flow reactor. The temperature o of the reactor was ramped up to 650° C. with a heating rate of 5° C./min and held at 650° C. for 12 hours. During ageing, 10% volume of water vapour in air was flowed through the reactor at a volumetric flow rate of 3 L/min. The resulting catalyst powder was an "aged" catalyst.
Measurement of Methane/Ethane Conversion The methane/ethane conversion efficiency were measured for "fresh" and "aged" forms of each of the zeolite catalysts in Examples 1 to 3.

0.03 g of the zeolite catalyst powder ("fresh" or "aged") was diluted with 0.15 g of cordierite powder and was then loaded into a flow-through quartz reactor. The test gas that was used to measure the methane/ethane conversion efficiency of each catalyst is shown in Table 1. In each case the balance is nitrogen. The gas flow rate is 550 mL/min and steady state conversion at 400° C. was measured.

TABLE 1

| | |
|---|---|
| $CH_4$ | 1120 ppm |
| $C_2H_6$ (as $C_1$) | 130 ppm |
| CO | 800 ppm |
| $O_2$ | 9% |
| $H_2O$ | 10% |
| $CO_2$ | 6% |
| Space velocity | 1,100 L $gcat^{-1}$ $h^{-1}$ |

The results in Table 2 below show methane/ethane conversion efficiencies at 400° C. for Pt/Pd Beta zeolite catalysts having 0.13 mol %, 1.10 mol % and 6.67 mol % of heteroatom.

TABLE 2

| Example No. | Zeolite | Amount of heteroatom (mol %) | Fresh conversion at 400° C. (%) | | Aged conversion at 400° C. (%) | |
|---|---|---|---|---|---|---|
| | | | Methane | Ethane | Methane | Ethane |
| 1 | BEA | 0.13 | 88 | 100 | 88 | 100 |
| 2* | BEA | 1.10 | 89 | 100 | 0 | 12 |
| 3* | BEA | 6.67 | 0 | 13 | 0 | 0 |

*indicates that the Example is for comparative purposes

The activity of the fresh catalysts improved significantly when the mol % of heteroatom was decreased from 6.67 mol % (Example 3) to 1.10 mol % (Example 2), but no notable further improvement was observed when the mol % of heteroatom was decreased from 1.10 mol % (Example 2) to 0.13 mol % (Example 1). However, after hydrothermal aging, the catalysts of Examples 2 and 3 with 1.10 mol % and 6.67 mol % respectively of heteroatom were significantly deactivated and showed no measurable methane conversion at 400° C. In contrast, the catalyst of Example 1 with 0.13 mol % of hetero atom on zeolite maintained its activity with nearly no deactivation observed.

The results demonstrate that although fresh performance of the catalyst can be improved significantly (c.f. the methane and ethane conversion results for Examples 2 and 3) when the amount of heteroatom is decreased from ~7 mol % to ~1 mol %, the hydrothermal durability is still poor. A significantly lower content of heteroatom was found to provide satisfactory hydrothermal durability whilst providing good catalytic activity.

Examples 4 to 11

A series of zeolite catalysts (PtPd zeolite) were prepared using the method of Example 1. The siliceous zeolite and the amount of heteroatom in each zeolite that was present in each catalyst are shown in Table 3 below.

Examples 12 and 13

The catalysts of Examples 12 and 13 were prepared using the method of Example 1, except that a powder sample of alumina (Example 12) or silica (Example 13) was used instead of the siliceous zeolite.
Experimental Results
Catalyst Ageing and Methane/Ethane Conversion Each of the catalysts was aged using the method described above. The methane and ethane conversion efficiency of aged catalysts of Examples 4 to 13 was measured using the same method and test gas described above. The results are shown in Table 3.

TABLE 3

| Example No. | Support | Amount of heteroatom (mol %) | Aged conversion at 400° C. (%) Methane | Ethane |
|---|---|---|---|---|
| 4* | BEA (zeolite) | 6.67 | 0 | 2 |
| 5* | BEA (zeolite) | 1.96 | 0 | 4 |
| 6* | BEA (zeolite) | 1.10 | 0 | 12 |
| 7 | BEA (zeolite) | 0.13 | 88 | 100 |
| 8* | MFI (zeolite) | 2.44 | 0 | 3 |
| 9 | MFI (zeolite) | 0.11 | 92 | 100 |
| 10* | FAU (zeolite) | 0.83 | 2 | 12 |
| 11* | FAU (zeolite) | 0.24 | 45 | 93 |
| 12* | Al$_2$O$_3$ | — | 9 | 43 |
| 13* | SiO$_2$ | — | 0 | 0 |

*indicates that the Example is for comparative purposes

The zeolite supports having an WI framework in Examples 8 and 9 were ZSM-5 zeolites. The zeolite catalyst of Example 9 (ZSM-5/PtPd) having 0.11 mol % of heteroatom and the zeolite catalyst of Example 7 (Beta/PtPd) having 0.13 mol % of heteroatom exhibited high and nearly equivalent methane and ethane conversions. As the heteroatom content in the zeolite increases from 0.13 mol % (Example 7) to 0.24 mol % (Example 11), the activity of the hydrothermally aged catalysts decreases until conversions became nearly zero when the heteroatom content was increased to 0.83 mol % (Example 10)

The data demonstrate that zeolite catalysts having a heteroatom content of less than 0.2 mol % is required to achieve high methane and ethane conversions after hydrothermal aging.

Examples 14 and 15

Zeolite catalysts (PtPd zeolite) were prepared using the method of Example 1, except that either an MFI-1 zeolite (Example 14) or an MFI-2 zeolite (Example 15) was used instead of BEA zeolite. The MFI-1 and MFI-2 zeolites that were used to prepare the catalysts are commercially available. The properties of the zeolite catalysts are shown in Table 4.

TABLE 4

| Property | Example 14 MFI-1 | Example 15 MFI-2 |
|---|---|---|
| Framework | MFI | MFI |
| Amount of heteroatom (mol %) | 0.094 | 0.094 |
| SAR | 2120 | 2120 |
| Cation type | H | H |
| BET (m$^2$/g) | 310 | 310 |
| Crystal size (μm) | 2 × 5 | 2 × 5 |

Experimental Results
Characterisation of Silanol Groups

Figure 2:
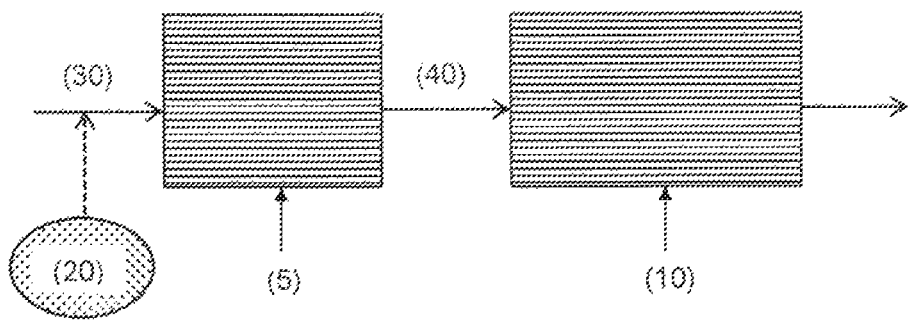
FIG. 2 shows an exhaust system comprising an oxidation catalyst (10) of the invention, which is downstream of a sulfur trap (5). Exhaust gas (30) produced by a natural gas engine is first passed through the sulfur trap (5). Additional hydrocarbon may be injected into exhaust gas (30) if a hydrocarbon injector (20) is present in the exhaust system. After passing through the sulfur trap (5), the exhaust gas (40) is then passed through the oxidation catalyst (10) of the invention.
Figure 3:
FIG. 3 shows an oxidation catalyst of the invention. The oxidation catalyst has a first region (3) at an outlet end of the catalyst, which is a zone comprising the catalytic material of the invention. There is also a second region (2) at an inlet end of the catalyst, which is a zone comprising a sulfur trapping material. Both the first region and the second region are disposed on a substrate (1).
Figure 4:
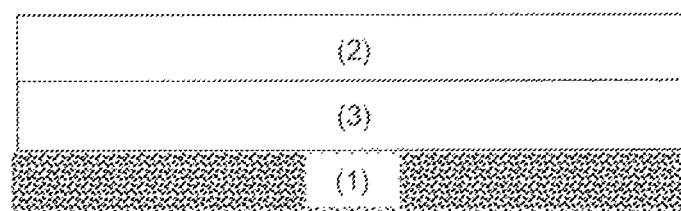
FIG. 4 shows an oxidation catalyst of the invention. The oxidation catalyst has a first region (3), which is a layer comprising the catalytic material of the invention. This layer is disposed on a substrate (1). There is also a second region (2), which is a layer comprising a sulfur trapping material and is disposed on the first region.
Figure 5:
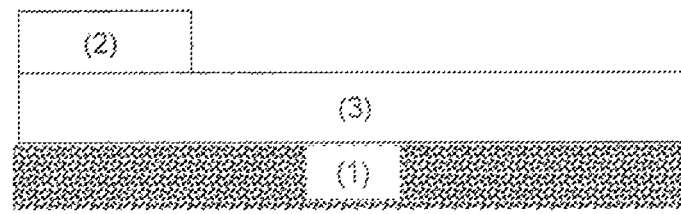
FIG. 5 shows an oxidation catalyst of the invention. The oxidation catalyst has a first region (3), which is a layer comprising the catalytic material of the invention. This layer is disposed on a substrate (1). There is also a second region (2), which is a zone comprising a sulfur trapping material and is disposed on the first region at an inlet end of the substrate.

The presence of a significant amount of silanol groups was determined by FTIR (Fourier Transformed Infrared) spectroscopy. 10 mg of each powdered zeolite catalyst (PtPd zeolite) was pressed into a self-supporting wafer. IR spectra for each sample were then obtained in transmission mode with a Thermo Nicole 670 FTIR spectrometer. The spectra resolution was 1 cm$^{-1}$, and each reported spectrum was averaged over 20 consecutive spectra. The spectra of the catalysts (zeolite impregnated with PtPd) and the zeolite support materials prior to impregnation with Pt and Pd are shown in FIGS. 1 and 2.

In the —OH stretching region (see FIG. 1), no bands are observed on MFI-1, indicating lack of hydroxyl groups on the zeolite. In contrast, several distinct features were identified on MFI-2 zeolite, including an intense and broad band centered at ~3425 cm$^{-1}$ and two small bands at 3695 and 3725 cm$^{-1}$. According to literature studies (J. Phys. Chem. 95 (1991), 872), the sharp bands at higher frequency may be assigned to isolated external silanol groups, and the broad band centred at 3425 cm$^{-1}$ may be assigned to hydrogen bonded silanol groups (e.g. silanol nest sites where the —OH groups are in close proximity).

The amount of silanol groups was determined by a K-uptake measurement as follows. Each zeolite was first calcined at 500° C. for 1 h prior to analysis. 0.5 g of each zeolite is then placed in a beaker with 50 ml of 1N KCl solution and stirred on a hotplate at room temperature for one hour to facilitate the ion exchange. The zeolite is then filtered and washed with 1N KCl solution. The stirring/filtering/washing steps were then repeated twice and the resulting product was dried at 80° C. in air overnight. The sample was then analysed with ICP (elemental analysis) for K concentration. The amount of strongly adsorbed K$^+$ remaining on the zeolite is proportional to the amount of silanol groups in a theoretical 1:1 molar ratio. The amount of silanol groups in each catalyst is shown in Table 5 below.

Catalyst Ageing and Methane/Ethane Conversion

Each of the catalysts of Examples 14 and 15 was aged using the method described above, except that each catalyst was aged for 50 hours instead of 12 hours. The methane and ethane conversion efficiency of the fresh and aged catalysts were measured using the same method and test gas described above. The results are shown in Table 5.

TABLE 5

| Example No. | Amount of silanol groups (mmol/g) | Fresh conversion at 400° C. (%) Methane | Ethane | Aged conversion at 400° C. (%) Methane | Ethane |
|---|---|---|---|---|---|
| 14 | 0.044 | 96.6 | 100 | 95.2 | 100 |
| 15 | 0.004 | 87.2 | 100 | 20.7 | 60.5 |

The results in Table 5 show that although both catalysts showed similar fresh performance, the zeolite catalyst containing MFI-1 had better methane/ethane conversion activity after hydrothermal ageing than the zeolite catalyst containing MFI-2. The contrast between the hydrothermal durability of Examples 14 and 15 directly correlate with the presence of silanol groups as characterised by FTIR and quantified by K-uptake.

Examples 16 and 17

Zeolite catalysts (PtPd zeolite) were prepared using the method of Example 1, except that either an MFI zeolite having 0.09 mol % of heteroatom (Example 16) or a BEA zeolite having 0.13 mol % of heteroatom (Example 17) was used instead of the BEA zeolite in Example 1. The properties of the zeolite catalysts are shown in Table 6.

The amount of silanol groups was measured for Examples 16 and 17 using the K-uptake method described above.

TABLE 6

|  | Example 16 | Example 17 |
| --- | --- | --- |
| Framework | MFI | BEA |
| Amount of heteroatom (mol %) | 0.09 | 0.13 |
| Amount of silanol groups (mmol/g) | 0.044 | 0.053 |

Experimental Results
Thermal Stability of Silanol Groups

The on-set decomposition temperature of silanol groups was measured for the catalysts of Examples 16 and 17 using differential scanning calorimetry (DSC) as follows. Typically, an alumina sample pan with 5 mg of the powder sample is loaded into a Mettler TGA equipped with a DTA sensor. The temperature is then ramped from 30° C. to 1000° C. at a rate of 10° C./min while both the sample weight and heat flow is monitored. Dry $N_2$ is flowed through the sample pan at 100 mL/min throughout the entire experiment.

Catalyst Ageing and Methane/Ethane Conversion

Each of the catalysts of Examples 16 and 17 was aged using the method described above, except that each catalyst was aged for 50 hours. The methane and ethane conversion efficiency of the fresh and aged catalysts were measured using the same method and test gas described above. The results are shown in Table 7.

TABLE 7

| Example No. | On-set decomposition temperature of silanol groups (° C.) | Fresh conversion at 400° C. (%) | | Aged conversion at 400° C. (%) | |
| --- | --- | --- | --- | --- | --- |
| | | Methane | Ethane | Methane | Ethane |
| 16 | 578 | 96.6 | 100 | 95.2 | 100 |
| 17 | 491 | 87.5 | 100 | 41.7 | 80.3 |

As shown in above table, although a similar amount of silanol groups is detected in the siliceous BEA zeolite of Example 17 compared to the siliceous MFI zeolite of Example 16, the silanol groups of Example 17 (MFI zeolite) are more thermally stable. As a result, the zeolite catalyst of Example 17 (PtPd/MFI) exhibits much higher hydrothermal stability than the zeolite catalyst of Example 16 (PtPd/BEA).

Example 18

Various washcoats comprising the zeolite catalyst of Example 14 (PtPd-MFI-1; 1:19/3 wt %) were prepared as set out in Table 8. A catalytic material in powder form was obtained from each washcoat using the drying conditions that would normally be used after applying the washcoat onto a substrate. The $CH_4$ conversion of each powder was tested using the gas composition shown in Table 1. The results are shown in Table 8.

TABLE 8

| Washcoat Preparative Method | pH | $CH_4$ conversion T50 (° C.) | $CH_4$ conversion at 400° C. (%) |
| --- | --- | --- | --- |
| No treatment (natural pH) | 4.0 | 334 | 95.6 |
| Addition of hydroxyethyl cellulose rheology modifier | 4.0 | 381 | 85.0 |
| Addition of xanthan gum rheology modifier | 4.0 | 459 | 15.1 |

TABLE 8-continued

| Washcoat Preparative Method | pH | $CH_4$ conversion T50 (° C.) | $CH_4$ conversion at 400° C. (%) |
| --- | --- | --- | --- |
| Mixed with an acid-stabilized alumina binder, the pH was lowered with $HNO_3$ | 1.9 | 375 | 56.7 |
| Mixed with an acid-stabilized alumina binder, the pH was raised with a hydroxyl base having a quarternary ammonium cation | 6.2 | 376 | 87.1 |
| Mixed with an acid-stabilized silica binder, no pH adjustment | 3.4 | 360 | 88.5 |
| Mixed with a base-stabilized silica binder, the pH was raised with a hydroxyl base having a quarternary ammonium cation | 11 | 345 | 96.9 |
| Raised pH with NaOH (no binder added) | 11 | N/A | 0 |
| Raised pH with a hydroxyl base having a quarternary ammonium cation (no binder added) | 11 | 345 | 96.8 |

Example 19

Various washcoats comprising a zeolite catalyst were prepared as set out in Table 9. Washcoats A and B in Table 9 below included the zeolite catalyst from Example 1. Washcoat C included the zeolite catalyst from Example 14. A catalytic material in powder form was obtained from each washcoat using the drying conditions that would normally be used after applying the washcoat onto a substrate. The $CH_4$ conversion of each powder was tested (gas composition: $CH_4$=4000 ppm, $C_2H_6$=100 ppm as $C_1$, $C_3H_8$=20 ppm as $C_1$, CO=1000 ppm, NO=500 ppm, $O_2$=12%, $H_2O$=11%, $CO_2$=7%, $N_2$ balance; space velocity=100,000 $h^{-1}$). The results are shown in Table 9.

TABLE 9

| | Washcoat Preparative Method | pH | $CH_4$ conversion: T50 (° C.) | at 450° C. (%) | at 550° C. (%) |
| --- | --- | --- | --- | --- | --- |
| A | Mixed with an acid-stabilized silica binder, xanthan gum rheology modifier, no pH adjustment | 3.4 | N/A | 0.0 | 19.6 |
| B | Mixed with an acid-stabilized alumina binder, hydroxyethyl cellulose rheology modifier, no pH adjustment | 2.3 | 430 | 79.2 | 93.1 |
| C | Mixed with an acid-stabilized alumina binder, no thickener, the pH was raised with a hydroxyl base having a quarternary ammonium cation | 6.4 | 413 | 90.8 | 98.8 |

Example 20

Various washcoats comprising a zeolite catalyst were prepared as set out in Table 10. Washcoats D and E included a zeolite catalyst of Example 16. A catalytic material in powder form was obtained from each washcoat using the drying conditions that would normally be used after applying the washcoat onto a substrate.

The $CH_4$ conversion of each powder was tested (gas composition: $CH_4$=4000 ppm, $C_2H_6$=200 ppm as $C_1$, $C_3H_8$=60 ppm as $C_1$, CO=1000 ppm, NO=500 ppm, $O_2$=12%, $H_2O$=11%, $CO_2$=7%, $N_2$ balance; space velocity=100,000 $h^{-1}$). The results are shown in Table 10 in the column headed "fresh".

A fresh sample of each powder was also aged hydrothermally (650° C., 10% $H_2O$ in ar for 200 h) and the $CH_4$ conversion of the resulting powders was tested using the same gas composition that was used for the fresh samples.

A fresh sample of each powder was also aged in the presence of sulfur (150 h, 560° C. in a gas composition containing 315 ppm $CH_4$, 50 pppm $SO_2$, 8.6% $O_2$, 13.5% $H_2O$, balance $N_2$) and the $CH_4$ conversion of the resulting powders was tested using the same gas composition that was used for the fresh samples.

TABLE 10

| | Washcoat | | $CH_4$ conversion | |
| --- | --- | --- | --- | --- |
| | | Amount of | at 500° C. (%): | |
| | Preparative Method | alumina binder in washcoat (%) | fresh | after hydrothermal ageing | after sulfur ageing |
| D | Mixed with an acid-stabilized alumina binder | 13.5 | 97.6 | 59.5 | 26.1 |
| E | Mixed with an acid-stabilized alumina binder and a base-stabilized silica binder | 2.7 | 97.3 | 90.1 | 77.2 |

For the avoidance of any doubt, the entire content of any and all documents cited herein is incorporated by reference into the present application.

The invention claimed is:

1. An oxidation catalyst for treating an exhaust gas produced by a natural gas (NG) engine, which oxidation catalyst comprises a catalytic material for treating the exhaust gas and a substrate,
    which catalytic material comprises a platinum (Pt), palladium (Pd) or a combination of platinum (Pt) and palladium (Pd) supported on a molecular sieve,
    wherein the molecular sieve, ia a zeolite, and has a content of heteroatom T-atoms of ≤about 0.20 mol %, and the molecular sieve has a molar ratio of silica to alumina (SAR) of ≥1500.

2. The oxidation catalyst of claim 1, wherein the catalytic material has a content of heteroatom T-atoms of <about 0.17 mol %.

3. The oxidation catalyst of claim 1, wherein the heteroatom is selected from the group consisting of aluminum (Al), boron (B), gallium (Ga), titanium (Ti), zinc (Zn), iron (Fe), vanadium (V) and combinations of any two or more thereof.

4. The oxidation catalyst of claim 1, wherein the framework comprises germanium in an amount of ≤about 10 mol %.

5. The oxidation catalyst of claim 1, wherein the framework consists essentially of silicon, oxygen and heteroatom T-atoms.

6. The oxidation catalyst of claim 1, wherein the molecular sieve does not have a content of heteroatom T-atoms.

7. The oxidation catalyst of claim 1, wherein the catalytic material has a total amount of the platinum group metal (PGM) of 0.01 to 30 wt %.

8. The oxidation catalyst of claim 1, wherein the catalytic material has a total amount of palladium of 0.1 to 20 wt %.

9. The oxidation catalyst of claim 1, wherein the molecular sieve is in a particulate form and has a D50 of 0.1 to 20 microns.

10. The oxidation catalyst of claim 1, wherein the substrate is a flow-through substrate or a filtering substrate.

11. The oxidation catalyst of claim 1, wherein the catalytic material is dispersed in the substrate.

12. An exhaust system comprising the oxidation catalyst of claim 1.

13. The exhaust system of claim 12 further comprising a sulfur trap.

14. The exhaust system of claim 13 comprising a first sulfur trap and a second sulfur trap, wherein the first sulfur trap and the second sulfur trap are arranged in parallel.

15. An apparatus comprising an engine and the exhaust system of claim 12.

16. The apparatus of claim 15, wherein the engine is a natural gas engine.

17. The apparatus of claim 16, wherein the engine is a lean burn internal combustion engine.

18. The oxidation catalyst of claim 1, wherein the zeolite is a small pore zeolite, a medium pore zeolite or a large pore zeolite.

19. The oxidation catalyst of claim 1, wherein the zeolite has a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, -ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, -SSO, SSY, STF, STO, STT, -SVR, SW, TON, TUN, UOS, UOV, UTL, UWY, VET, VNI.

20. The oxidation catalyst of claim 1, wherein the molecular sieve is a small pore zeolite having an AEI, AFX, ANA, CDO, CHA, DDR, EAB, EDI, EPI, ERI, IHW, ITE, ITW, KFI, LEV, MER, NSI, PAU, PHI, RHO, RTH, UFI or VNI framework type.

21. The oxidation catalyst of claim 20, wherein the molecular sieve is a small pore zeolite having a CHA, CDO or DDR framework type.

22. The oxidation catalyst of claim 1, wherein the molecular sieve is a medium pore zeolite having an MFI, MEL, MWW or EUO framework type.

23. The oxidation catalyst of claim 1, wherein the molecular sieve is a large pore zeolite having an AFI, BEA, CON, EMT, FAU, or MOR framework type.

24. The oxidation catalyst of claim 1, wherein the molecular sieve has a BEA, CDO, CON, MEL, MWW, MFI, or FAU framework type.

25. The oxidation catalyst of claim 1, wherein the molecular sieve has a BEA or MFI framework type.

26. A method of treating an exhaust gas comprising methane, the method comprising contacting the exhaust gas with an oxidation catalyst of claim 1.

* * * * *